United States Patent
Shen et al.

(10) Patent No.: US 6,697,052 B2
(45) Date of Patent: Feb. 24, 2004

(54) OPTICAL MOUSE CHIP WITH SILICON RETINA STRUCTURE

(75) Inventors: Chi-Ting Shen, Taipei Hsien (TW); Ming-Chieh Tsou, Taipei Hsien (TW); Yu-Meng Chang, I Lan Hsien (TW); Kuan-Hsun Huang, Yunlin Hsien (TW); Li-Ju Lin, Nantou Hsien (TW); Chung-Yu Wu, Hsinchu (TW)

(73) Assignee: Lite-On Semiconductor Corp., Taipei (TW)

( * ) Notice: Subject to any disclaimer, the term of this patent is extended or adjusted under 35 U.S.C. 154(b) by 133 days.

(21) Appl. No.: 09/985,200

(22) Filed: Nov. 2, 2001

(65) Prior Publication Data

US 2003/0085875 A1 May 8, 2003

(51) Int. Cl.$^7$ .................................................. G09G 5/08
(52) U.S. Cl. ........................ 345/166; 345/163; 345/175; 345/179; 178/18.09; 250/208.1
(58) Field of Search ............................... 345/156, 157, 345/163, 165, 166, 173, 175, 179; 178/18.01, 18.03, 18.09–18.11; 250/203.1, 203.3, 208.1

(56) References Cited

U.S. PATENT DOCUMENTS

| | | | | |
|---|---|---|---|---|
| 4,794,384 A | * | 12/1988 | Jackson ....................... | 345/166 |
| 4,920,260 A | * | 4/1990 | Victor et al. ................. | 250/221 |
| 5,517,211 A | * | 5/1996 | Kwang-Chien ............. | 345/166 |
| 6,172,354 B1 | * | 1/2001 | Adan et al. .................. | 250/221 |
| 6,433,780 B1 | * | 8/2002 | Gordon et al. .............. | 345/166 |
| 6,501,460 B1 | * | 12/2002 | Paik et al. ................... | 345/163 |
| 6,531,692 B1 | * | 3/2003 | Adan et al. .................. | 250/221 |
| 2002/0030669 A1 | * | 3/2002 | Funakoshi ................... | 345/175 |
| 2002/0080121 A1 | * | 6/2002 | Son ............................. | 345/166 |

* cited by examiner

Primary Examiner—Richard Hjerpe
Assistant Examiner—Henry N. Tran
(74) Attorney, Agent, or Firm—Rosenberg, Klein & Lee

(57) ABSTRACT

An optical mouse chip with silicon retina structure comprises an image sensor array, an accumulator and a comparing/selecting unit. The image sensor array senses a direction parameter of an image along each axis. The accumulator sums the direction parameters of the image along different axes. The comparing/selecting unit selects a largest one from the sum of direction parameters of the image along different axes to determine a moving direction of the image.

12 Claims, 8 Drawing Sheets

OPTICAL MOUSE CHIP WITH SILICON RETINA STRUCTURE

FIELD OF THE INVENTION

The present invention relates to an optical mouse chip with silicon retina structure, especially to an optical mouse chip applied to image edge abstraction and detection of moving body.

BACKGROUND OF THE INVENTION

The use of a hand operated pointing device for use with a computer and its display has become almost universal. For example, an optical mouse is used in conjunction with a specific mouse pad. The recently developed mouse can operate on pad of various stuffs by image recognition skill.

FIG. 1 shows a block diagram of a prior art optical mouse chip, which comprises an image acquisition unit $1a$, a digital signal processing unit $2a$ and a converting unit $3a$. The image acquisition unit $1a$ captures an image corresponding to the motion of mouse and converts an analog image signal corresponding to image into a digital image signal. The digital signal processing unit $2a$ receives the digital image signal and manipulates the digital image signal to find the moving direction of the image and the converting unit $3a$ converts the moving direction of the image into PS/2 signal or quadrant signal format compatible to mouse adaptor or mouse controller.

In above-mentioned optical mouse chip, the processing unit $2a$ receives the digital image signal from the image acquisition unit $1a$ and manipulates the digital image signal to find the moving direction of the image. It is hard for the processing unit $2a$ to detect finer image or faster movement of image if the data amount of the image acquisition unit $1a$ is increased.

FIG. 2 shows the block diagram of a moving image detector, which comprises a plurality of silicon retina cells $8a$. Each of the silicon retina cells $8a$ comprises a sensor $4a$, an abstracting unit Sa, a delay unit $6a$ and a comparing unit $7a$. The sensor $4a$ detects image variation to generate an analog signal and converts the analog signal to a digital signal. The abstracting unit $5a$ is connected to an output end of the sensor $4a$ and converting the digital signal to an image-moving signal. The delay unit $6a$ is connected to an output end of the abstracting unit $5a$ and delays the image-moving signal of the abstracting unit $5a$. The comparing unit $7a$ is connected between the output end of an abstracting unit $5a$ in the same silicon retina cell $8a$ and the delay unit $6a$ of previous same silicon retina cell $8a$ to discriminate the movement of the image.

Moreover, a plurality of the silicon retina cells $8a$ can be grouped to synthesis a neuro network; and the moving speed and the moving direction of an image can be determined by interactive algorithm with delay and comparison operations. This interactive algorithm does not involve the processing unit $2a$ and the processing time is not increased with the data amount of the image acquisition unit $1a$.

However, in above-mentioned moving image detector, the delay unit $6a$ requires time adjustment to comply with the moving speed of image in certain condition. Moreover, binary pulses are generated along upward/downward and right/left directions to determine the moving direction of image. The moving direction of image may be incorrectly judged if binary pulses are not generated along some directions.

SUMMARY OF THE INVENTION

It is an object of the present invention to provide an optical mouse chip with silicon retina structure and having fixed delay time between adjacent scan, thus determining the moving direction of image with enhanced speed and resolution.

It is another object of the present invention to provide an optical mouse chip with silicon retina structure, which selects a largest one among a plurality of direction parameters to determine the moving direction of the image after one scanning process, thus accurately determining the moving direction of image.

It is still another object of the present invention to provide an optical mouse chip with silicon retina structure, which use bipolar transistor to find edge variation of the image.

To achieve above object, the present invention provides an optical mouse chip with silicon retina structure comprising an image sensor array, an accumulator and a comparing/selecting unit. The image sensor array is a neuro network composed of a plurality of silicon retina cells and each of the silicon retina cells sensing a direction parameter of an image along an axis. The accumulator is connected to an output end of the image sensor array and sums the direction parameters of the image along different axes. The comparing/selecting unit is connected to an output end of the accumulator and selects a largest one from the sum of direction parameters of the image along different axes to determine a moving direction of the image.

The various objects and advantages of the present invention will be more readily understood from the following detailed description when read in conjunction with the appended drawing, in which:

DETAILED DESCRIPTION OF THE INVENTION

Figure 1:
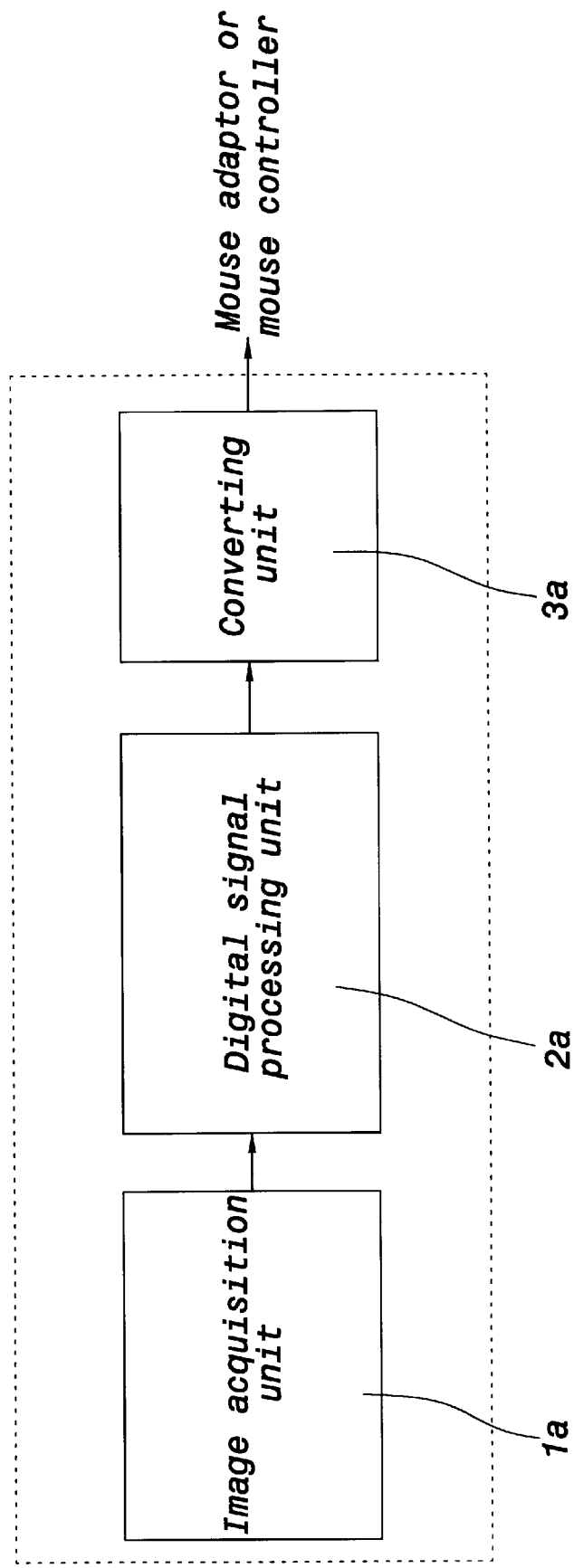
FIG. 1 shows a block diagram of a prior art optical mouse chip.
Figure 2:
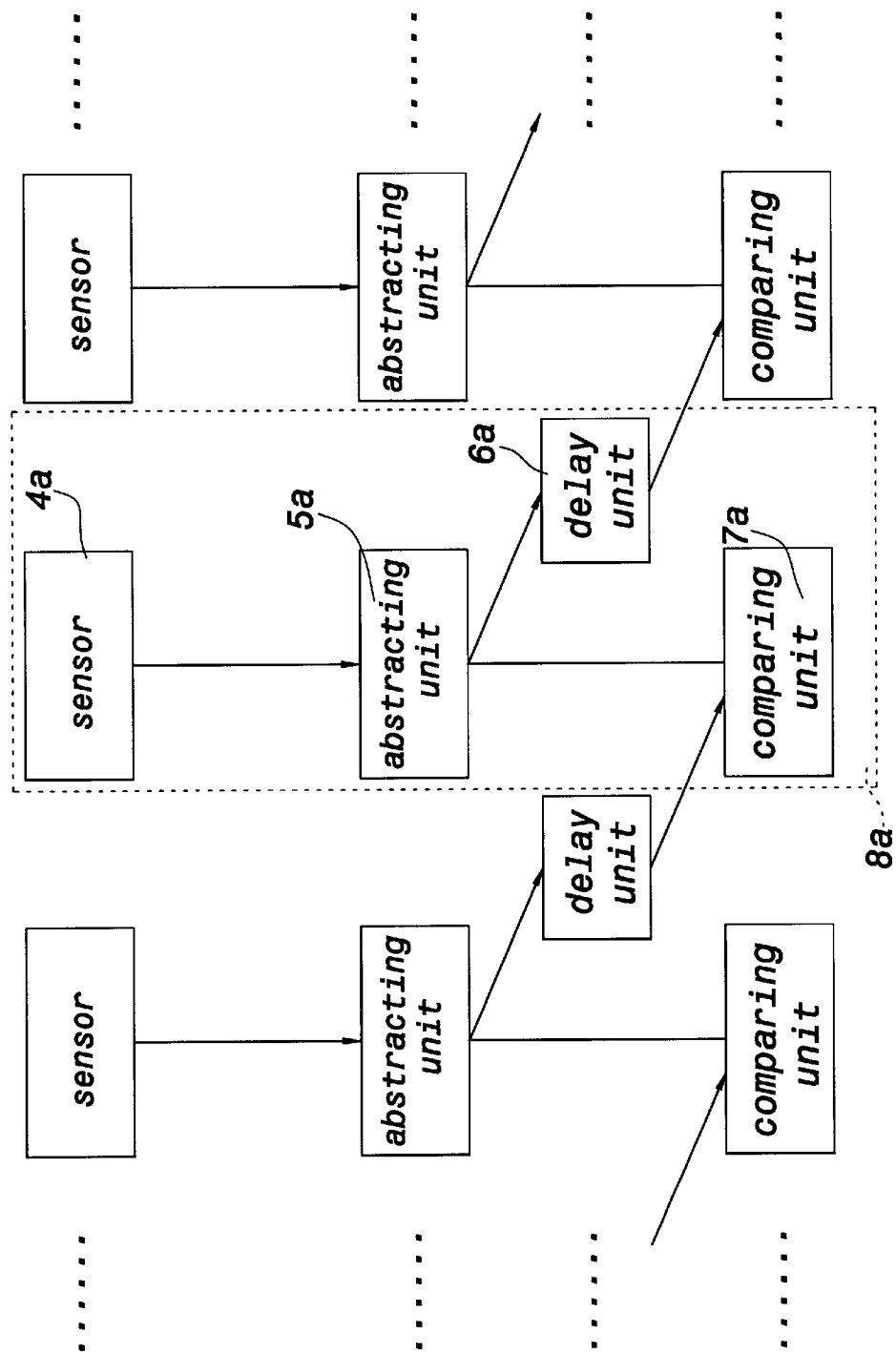
FIG. 2 shows the block diagram of a prior art moving image detector
Figure 3:
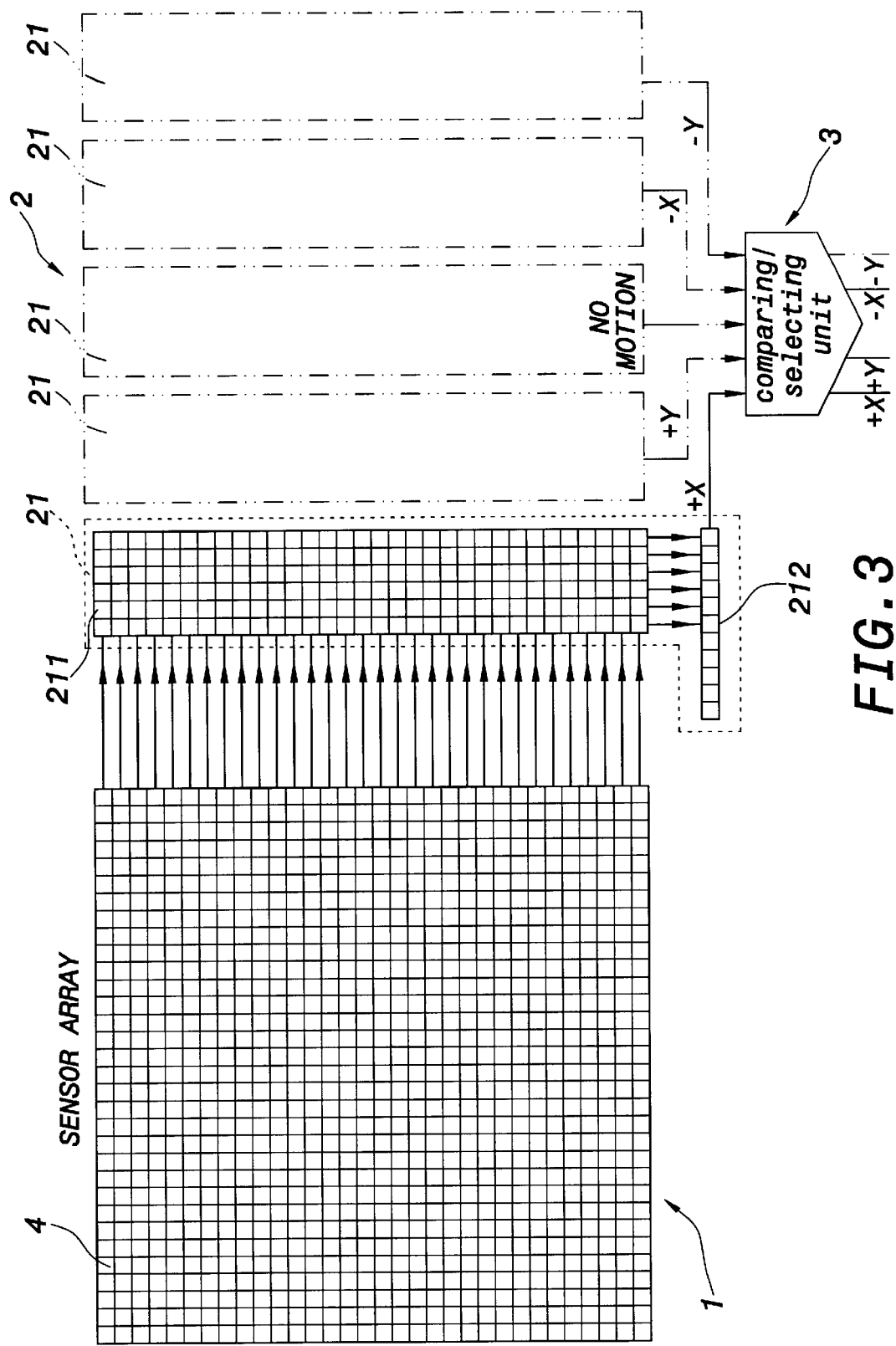
FIG. 3 shows a schematic diagram of a preferred embodiment of the present invention.

FIG. 3 shows a schematic diagram of a preferred embodiment of the present invention. The present invention provides an optical mouse chip with silicon retina structure, which comprises an image sensor array 1, an accumulator 2 and a comparing/selecting unit 3.

The image sensor array 1 is used for image detection and is a neuro network composed of a plurality of silicon retina cells 4. The neuro network can perform high-speed computation with parallel and distributed processing ability. Moreover, the neuro network can process vast amount of data and output moving parameters of image such as upward/downward, rightward/leftward movement and no motion.

The accumulator 2 is connected to an output of the image sensor array 1 and composed of five accumulating modules 21 for accumulating five different directional parameters (+X, +Y, no motion, −X, −Y as shown in this figure) output by the silicon retina cells 4. More particularly, each of the accumulating modules 21 comprises a plurality of row accumulating sections 211 and an area accumulating section 212. The row accumulating sections 211 are used to accumulate the five different directional parameters output by a row of the silicon retina cells 4. The area accumulating section 212 is used to accumulate the output of the plurality of row accumulating sections 211, thus obtaining net result of the five moving parameters of the image.

The comparing/selecting unit 3 is connected to an output of the accumulator 2 and selects a largest value among the five different directional parameters to determine the moving direction of the image.

Figure 4:
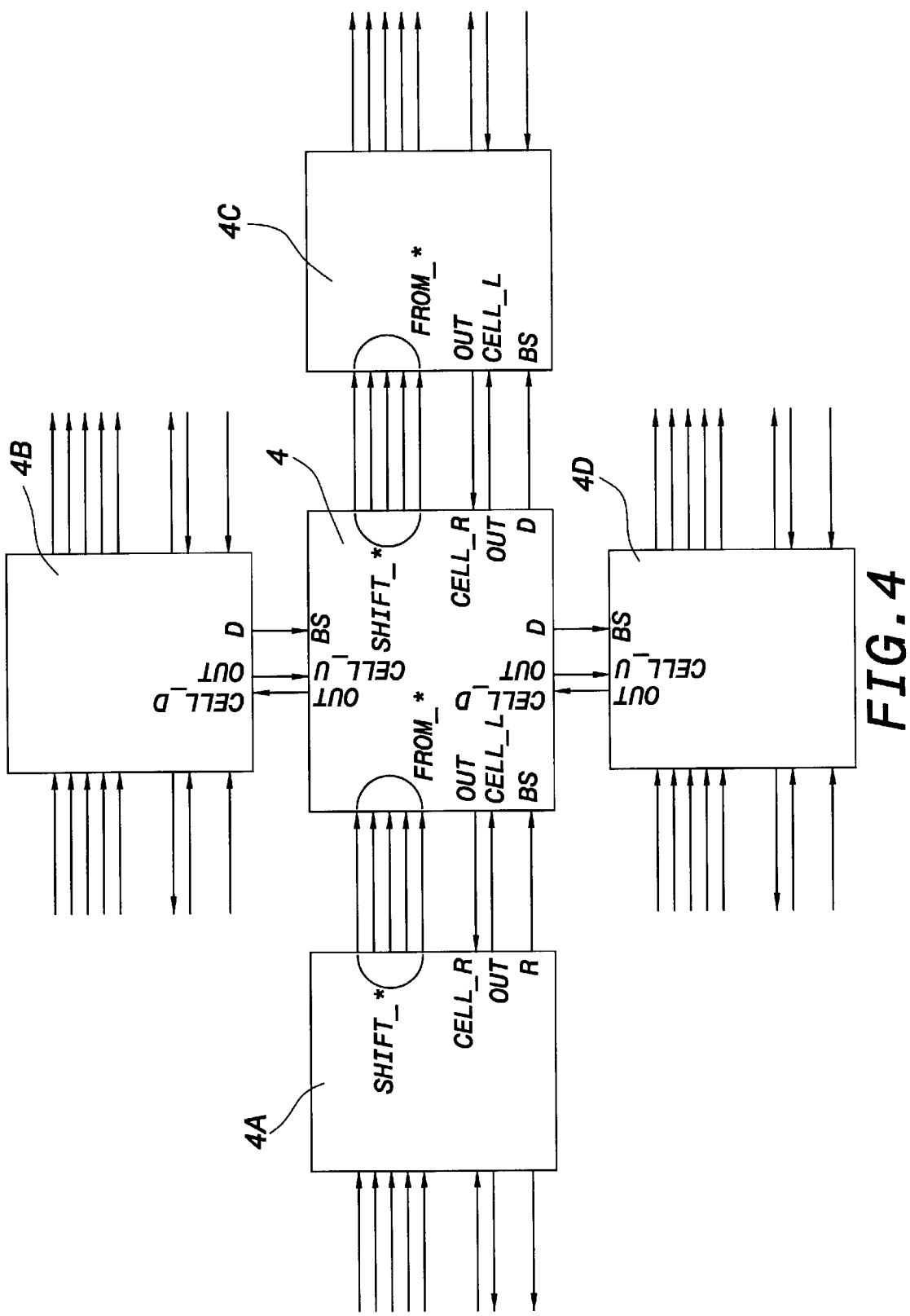
FIG. 4 shows the connection among a plurality of silicon retina cells.
Figure 5:
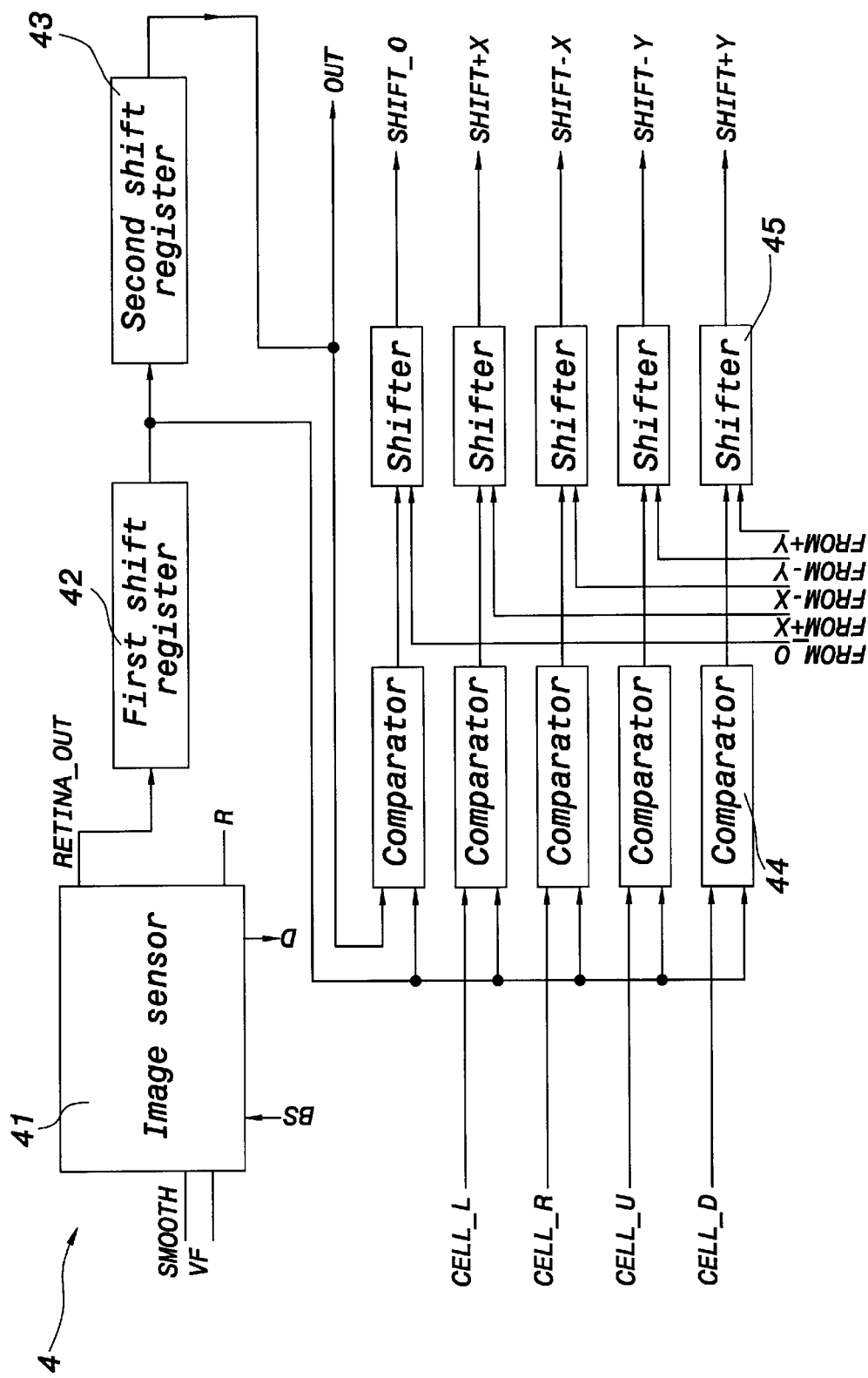
FIG. 5 shows the structure of one silicon retina cell.

With reference now to FIGS. 4 and 5, the connection among a plurality of silicon retina cells 4 and the structure of one silicon retina cell 4 are demonstrated. In FIG. 4, a silicon retina cell 4 is connected to four adjacent silicon retina cells 4A, 4B, 4C and 4D on upper/lower and right/left directions thereof to form a neuro network. The silicon retina cell 4 has five outputs (SHIFT_O, SHIFT+X, SHIFT−X, SHIFT+Y, SHIFT−Y) associated with the five different directional parameters of image and the five outputs are sent to silicon retina cell 4C in next row. Moreover, the silicon retina cell 4 receives output data from four adjacent silicon retina cells 4A, 4B, 4C and 4D (CELL_R, CELL_D, CELL_L, CELL_U). In this way, the silicon retina cell 4 communicates with its four adjacent silicon retina cells 4A, 4B, 4C and 4D to recognize the moving direction of image. Alternatively, the silicon retina cell 4 can also be connected to eight adjacent silicon retina cells along upper, lower, right, left, upper right, lower right, upper left, lower left directions to synthesis larger neuro network and recognize finer moving direction of image.

As shown in FIG. 5, the silicon retina cell 4 comprises an image sensor 41, a first shift register 42, a second shift register 43, five comparators 44 and five shifters 45. The image sensor 41 detects the edge variation of the image and generates a detection signal RETINA_OUT with rising edge or falling edge when edge variation occurs. The first shift register 42 is connected to an output of the image sensor 41 and stores the detection signal RETINA OUT of the image sensor 41. The second shift register 43 is connected to an output of the first shift register 42 and stores the detection signal RETINA_OUT output by the first shift register 42. Each of the comparators 44 is connected to the output of the first shift register 42 and recognizes the variation of moving direction for the image by comparison operation. The shifters 45 are connected to an output of corresponding comparators 44 and shift the five outputs (SHIFT_O, SHIFT+X, SHIFT−X, SHIFT+Y, SHIFT−Y) associated with the five different directional parameters of image to the silicon retina cell 4C in next row.

The image sensor 41 sends a detection signal RETINA_OUT to the first shift register 42 during a scanning process and the detection signal RETINA_OUT is moved from the first shift register 42 to the second shift register 43 in next scanning process. At this time, the output of the second shift register 43 is connected to the comparator 44 thereof and to the comparator 44 of adjacent silicon retina cells 4A, 4B, 4C and 4D. Similarly, the output end of the second shift register 43 of the adjacent silicon retina cells 4A, 4B, 4C and 4D are connected to the comparators 44 of the silicon retina cell 4. More particularly, the delay time between two scanning process is fixed and depends on operation frequency. Therefore, the drawback of variable delay time in prior art is solved. Moreover, the delay time between two scanning process is decreased when operation frequency is increased.

In case that the level of the detection signal stored by the image sensor 41 into the first shift register 42 is corresponding with one of the levels of the output signals (CELL_R, CELL_D, CELL_L, CELL_U) from the second shift register 43 of the adjacent silicon retina cells 4A, 4B, 4C and 4D during previous scan, the corresponding comparator 44 generates a pulse to indicate the detected direction of the image. In case that the level of the detection signal stored by the image sensor 41 into the first shift register 42 is corresponding with the detection signal stored in the second shift register 43 of the silicon retina cell 4 pre se during previous scan, the corresponding comparator 44 generates a pulse SHIFT_O to indicate image having no motion.

Figure 6:
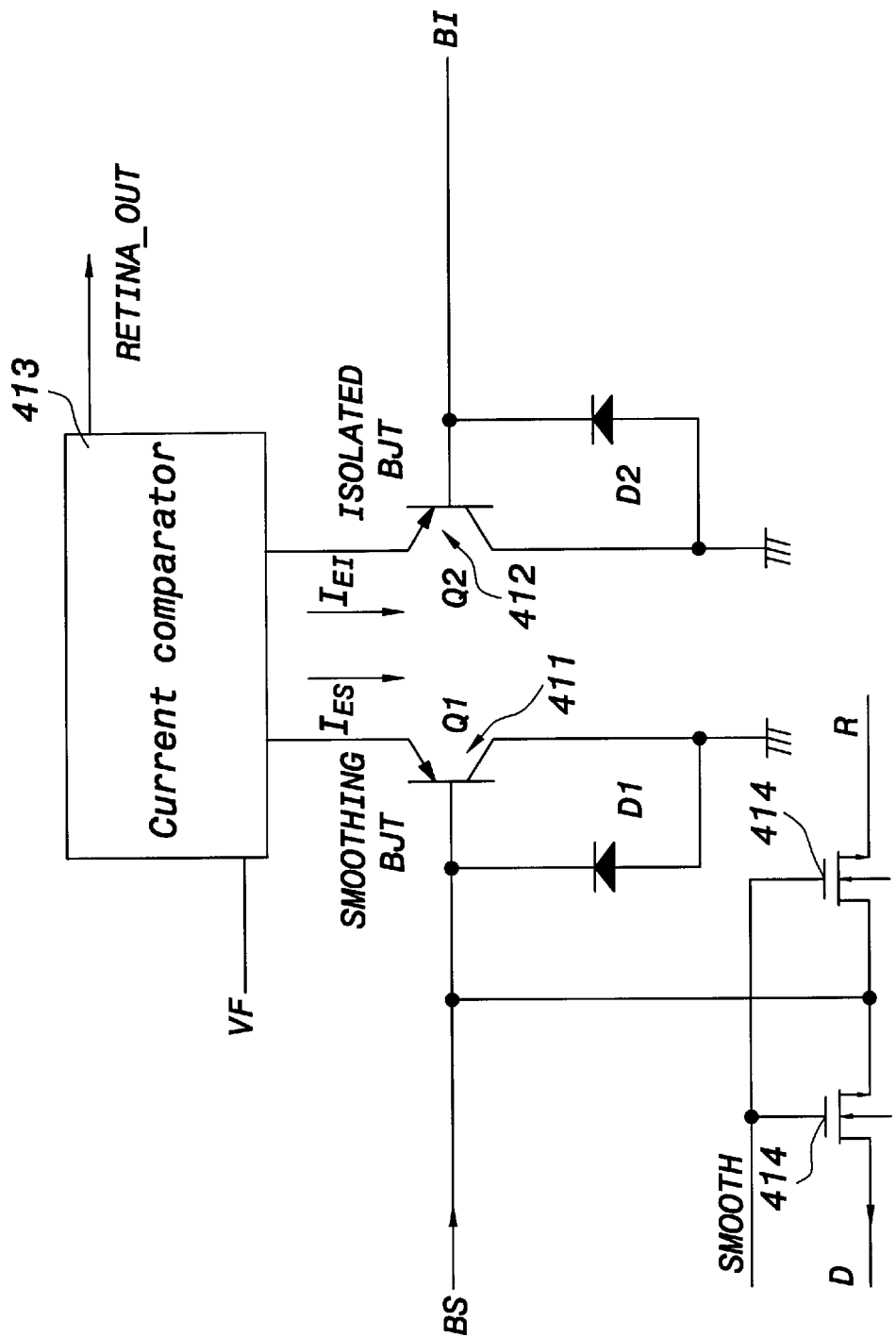
FIG. 6 shows the architecture of the image sensor of the present invention.

FIG. 6 shows the architecture of the image sensor 41 of the present invention. The image sensor 41 comprises a smoothing bipolar transistor (BJT) 411, an isolated bipolar transistor (BJT) 412 and a current comparator 413. The smoothing bipolar transistor 411 is used with the isolated bipolar transistor 412 to detect the edge variation of an image; and the smoothing bipolar transistor 411 and the isolated bipolar transistor 412 generate currents $I_{ES}$ and $I_{EI}$, respectively. The current comparator 413 is connected to the emitter of the smoothing bipolar transistor 411 and the emitter of the isolated bipolar transistor 412 to sense the variation of the currents $I_{ES}$ and $I_{EI}$, respective, and generates a detection signal RETINA_OUT. The image sensor 41 of the present invention further has an enhanced NMOS transistor 414 as resistor connected to the bases of adjacent smoothing bipolar transistors 411 to provide a smoothing circuit with the smoothing bipolar transistors 411.

Both of the smoothing bipolar transistor 411 and the isolated bipolar transistor 412 have current variation when the image to be detected has motion. The smoothing bipolar transistor 411 has different current variation magnitude than the isolated bipolar transistor 412 due to the effect of the smoothing circuit. The current comparator 413 can discriminate the different current variation magnitude and provides a detection signal RETINA OUT with rising edge or falling edge when edge variation occurs.

Figure 7:
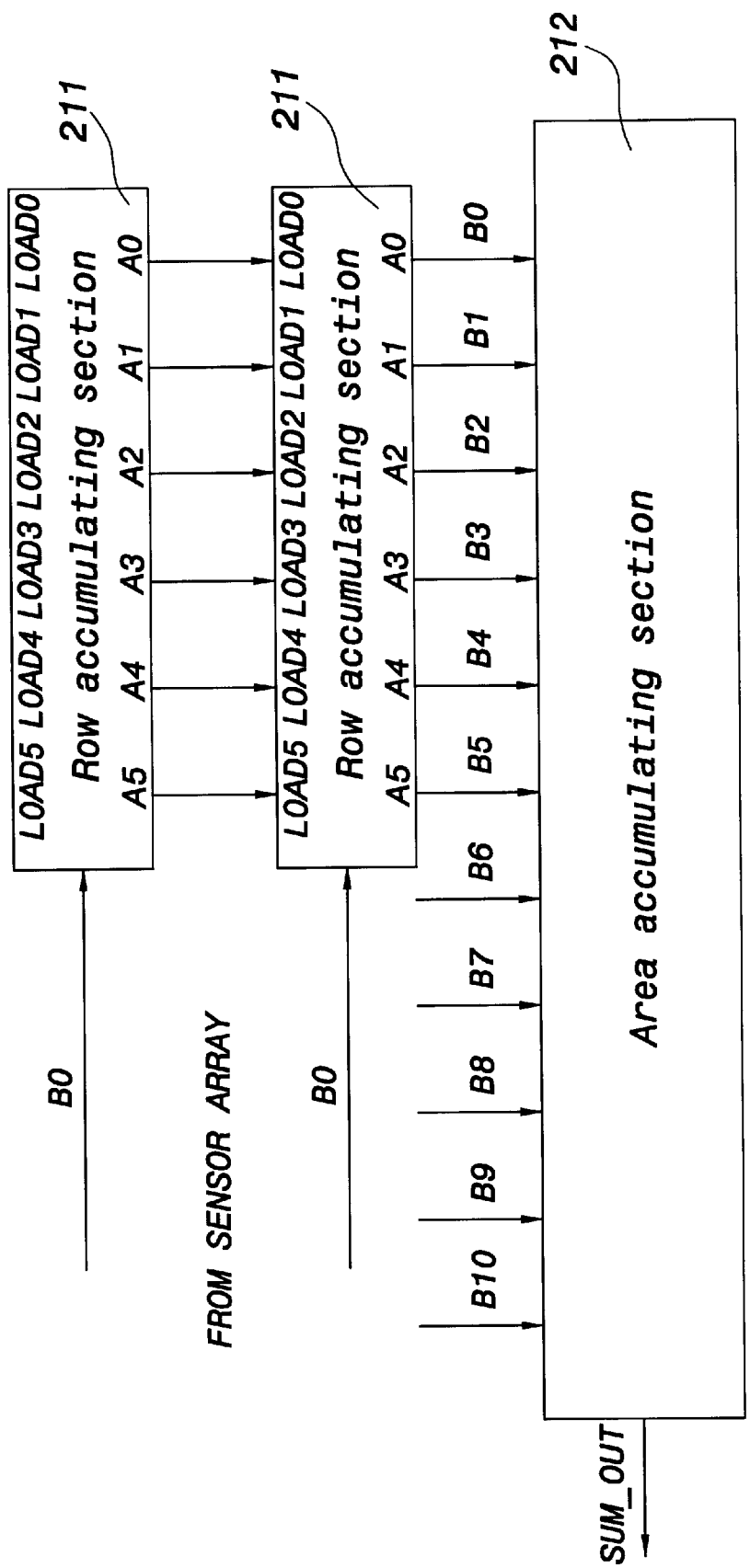
FIG. 7 shows the architecture of an accumulating module.

FIG. 7 shows an accumulating module 21 of the accumulator 2. With reference also to FIG. 3, the input of the accumulator 2 is connected to the output of the image sensor array 1. The bit number of the row accumulating section 211 is determined by the number of the silicon retina cell 4 in a row. The output of the row accumulating section 211 is connected to the row accumulating section 211 of next row. The output of the row accumulating section 211 in the last row is connected to the area accumulating section 212. The bit number of the area accumulating section 212 is determined by the total number of the silicon retina cells 4. The area accumulating section 212 generates a cumulative sum SUM_OUT.

Figure 8:
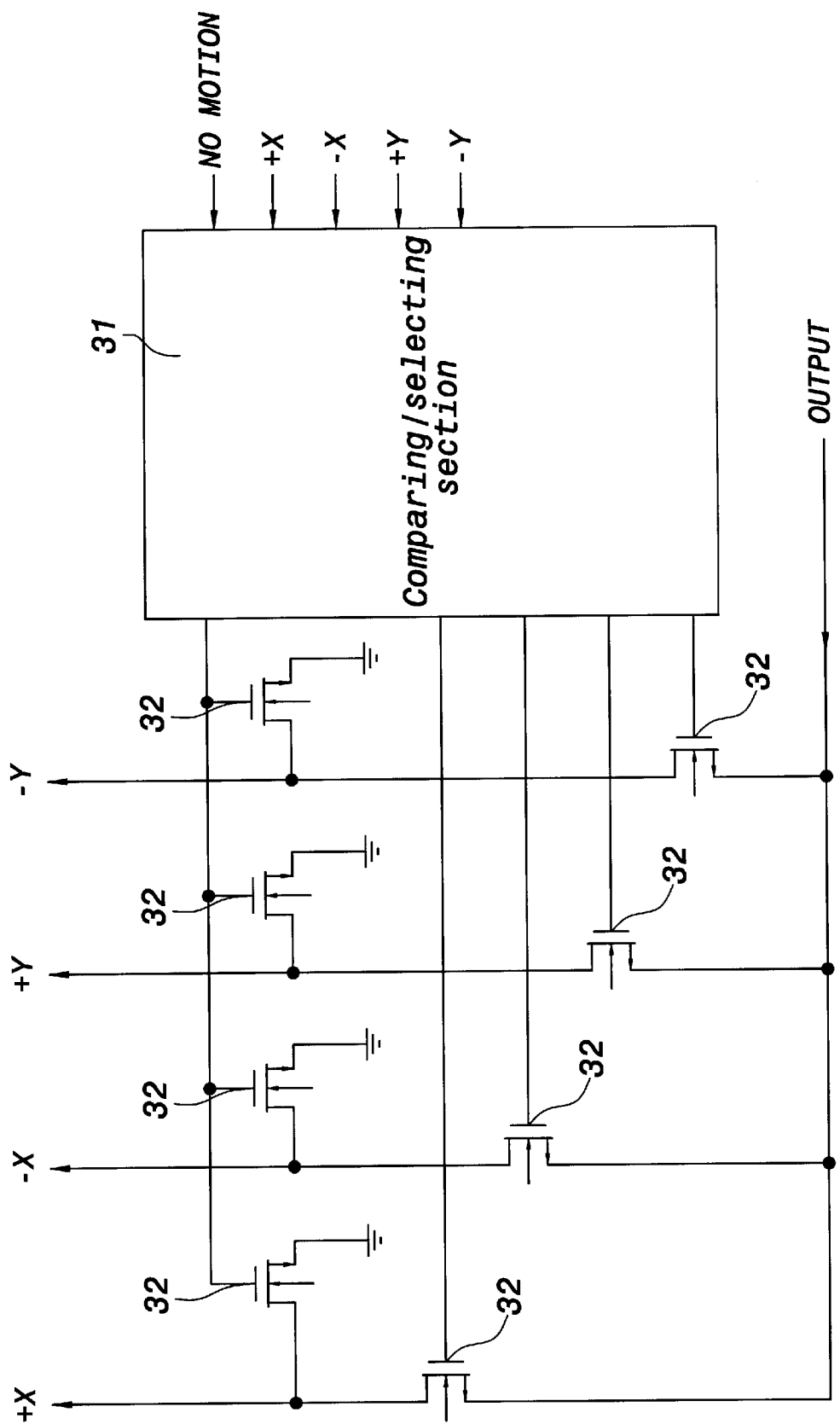
FIG. 8 shows the architecture of the comparing/selecting unit of the present invention.

FIG. 8 shows the architecture of the comparing/selecting unit 3 of the present invention. The comparing/selecting unit 3 of the present invention comprises a comparing/selecting section 31 with five inputs and four outputs and a plurality of enhanced NMOS transistors 32. The comparing/selecting section 31 receives five cumulative sums SUM_OUT associated with the five different directional parameters of image and selects a largest value among the five different directional parameters to determine the moving direction of the image. The comparing/selecting section 31 generates a pulse to indicate the moving direction of the image. Therefore, the incorrect recognition of moving direction of the image can be prevented. The enhanced NMOS transistors 32 are connected to output ends of the comparing/selecting section 31 and used to output the pulse for indicating the moving direction of the image. The pulse has a period determined by an operation frequency OUT from a timing control circuit (not shown). When the operation frequency OUT is increased, the elapsed time for image sensing and comparison is reduced, thus refining the recognition of moving direction.

To sum up, the optical mouse chip with silicon retina structure according to the present invention has following advantages:

1. Determining the moving direction of image with enhanced speed and resolution.
2. Accurately determining the moving direction of image.
3. Ability to processing vast amount of data.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An optical mouse chip with silicon retina structure, comprising:
    an image sensor array being a neuro network composed of a plurality of silicon retina cells, each of the silicon retina cells sensing a direction parameter of an image along an axis, the silicon retina cells being arranged in a plurality of rows, each silicon retina cell having five different direction parameters, which are sent to a silicon retina cell in a next row, each silicon retina cell receiving output from an adjacent silicon retina cell;
    an accumulator connected to an output end of the image sensor array and summing the direction parameters of the image along different axes; and,
    a comparing/selecting unit connected to an output end of the accumulator and selecting a largest one from the sum of direction parameters of the image along the different axes to determined a moving direction of the image.

2. An optical mouse chip with silicon retina structure, comprising:
    an image sensor array being a neuro network composed of a plurality of silicon retina cells, each of the silicon retina cells sensing a direction parameter of an image along an axis, each of the silicon retina cell including:
        (a) an image sensor sensing an edge of the image and generating a detection signal having pulse of rising edge or falling edge when edge variation occurs;
        (b) a first shift register connected to an output of the image sensor and storing the detection signal;
        (c) a second shift register connected to an output of the first shift register and storing the detection signal from the first shift register;
        (d) a plurality of comparators, each connected to an output of the first shift register and used to recognizing variation of the moving direction of the image; and
        (e) a plurality of shifters connected to outputs of the comparators and sending the direction parameter to silicon retina cell of next row;
    an accumulator connected to an output end of the image sensor array and summing the direction parameters of the image along different axes; and,
    a comparing/selecting unit connected to an output end of the accumulator and selecting a largest one from the sum of direction parameters of the image along the different axes to determined a moving direction of the image.

3. The optical mouse chip with silicon retina structure as in claim 2, wherein the image sensor comprises:
    a smoothing bipolar transistor generating a first current with respect to movement of the image;
    an isolated bipolar transistor generating a second current with respect to movement of the image; and
    a current comparator connected to the emitter of the smoothing bipolar transistor and the emitter of the isolated bipolar transistor, the current comparator generating a detection signal by comparing the first and the second currents.

4. The optical mouse chip with silicon retina structure as in claim 3, wherein an enhanced NMOS transistor is connected to the base of the smoothing bipolar transistor and functioned as a resistor, thus forming a smoothing circuit with the smoothing bipolar transistor.

5. An optical mouse chip with silicon retina structure, comprising:
    an image sensor array being a neuro network composed of a plurality of silicon retina cells, each of the silicon retina cells sensing a direction parameter of an image along an axis;
    an accumulator connected to an output end of the image sensor array and summing the direction parameters of the image along different axes, the accumulator being composed of a plurality of accumulating modules corresponding to each axis to sum the direction parameters along different axes; and,
    a comparing/selecting unit connected to an output end of the accumulator and selecting a largest one from the sum of direction parameters of the image along the different axes to determined a moving direction of the image.

6. The optical mouse chip with silicon retina structure as in claim 5, wherein the accumulating module comprises a plurality of row accumulating sections and an area accumulating section.

7. The optical mouse chip with silicon retina structure as in claim 6, wherein each of the row accumulating sections is used to sum the direction parameters for a row of silicon retina cells.

8. The optical mouse chip with silicon retina structure as in claim 6, wherein the area accumulating section is used to sum the summed direction parameters from all of the row accumulating sections.

9. An optical mouse chip with silicon retina structure, comprising:
    an image sensor array being a neuro network composed of a plurality of silicon retina cells, each of the silicon retina cells sensing a direction parameter of an image along an axis;
    an accumulator connected to an output end of the image sensor array and summing the direction parameters of the image along different axes; and,
    a comparing/selecting unit connected to an output end of the accumulator and selecting a largest one from the sum of direction parameters of the image along the different axes to determined a moving direction of the image, the comparing/selecting unit including:
(a) a comparing/selecting section receiving the summed direction parameters of image and selecting a largest one among the different direction parameters to determine the moving direction of the images, the comparing/selecting section generating a pulse to indicate the moving direction of the image; and
(b) a plurality of enhanced NMOS transistors connected to output ends of the comparing/selecting section and used to control the pulse.

10. The optical mouse chip with silicon retina structure as in claim 9, wherein the comparing/selecting section has five inputs and four outputs.

11. The optical mouse chip with silicon retina structure as in claim 9, wherein the pulse has a period determined by an operating frequency of the image sensor.

12. The optical mouse chip with silicon retina structure as in claim 11, wherein the frequency of the image sensor is increased to reduce the period of the pulse.

* * * * *